(12) United States Patent
Sueshige

(10) Patent No.: US 7,434,637 B2
(45) Date of Patent: Oct. 14, 2008

(54) WORKING-MACHINE STEERING APPARATUS

(75) Inventor: Hiroshi Sueshige, Wako (JP)

(73) Assignee: Honda Motor Co., Ltd. (JP)

( * ) Notice: Subject to any disclaimer, the term of this patent is extended or adjusted under 35 U.S.C. 154(b) by 372 days.

(21) Appl. No.: 11/262,332

(22) Filed: Oct. 28, 2005

(65) Prior Publication Data

US 2006/0090585 A1    May 4, 2006

(30) Foreign Application Priority Data

Oct. 29, 2004   (JP)   ............... 2004-316102

(51) Int. Cl.
*B62D 11/00* (2006.01)
(52) U.S. Cl. .................. 180/6.32; 180/6.2; 180/6.7
(58) Field of Classification Search ............. 180/6.32, 180/6.2, 6.7; 74/491
See application file for complete search history.

(56) References Cited

U.S. PATENT DOCUMENTS

| 3,743,043 | A | * | 7/1973 | Gelinas | ............ 180/6.2 |
| 4,977,970 | A | * | 12/1990 | Steiger | ............ 180/6.2 |
| 5,918,691 | A | * | 7/1999 | Ishii | ............ 180/6.48 |

FOREIGN PATENT DOCUMENTS

JP          02168067       6/1990

* cited by examiner

*Primary Examiner*—Lesley D. Morris
*Assistant Examiner*—Marc A Scharich
(74) *Attorney, Agent, or Firm*—Adams & Wilks

(57) ABSTRACT

Working-machine steering apparatus includes an assist mechanism for reducing a force necessary for operating any one of left and right operating members. First and second cord members, connected to the left and right operating members, are wound on first and second pulleys in a U shape with given pre-slack. As a human operator operates any one of the left and right operating members, the corresponding left or right cord member is brought into close contact with the first or second pulley, so that rotation of a drive source is transmitted to the first or second pulley via a rotation shaft. The necessary operating force of the left and right operating members can be reduced using the rotation of the drive source via the assist mechanism.

3 Claims, 11 Drawing Sheets

WORKING-MACHINE STEERING APPARATUS

FIELD OF THE INVENTION

The present invention relates to a working-machine steering apparatus which can effectively reduce a necessary force for manipulating or operating an operating lever or the like of a working machine.

BACKGROUND OF THE INVENTION

Various types of techniques that can be used to reduce a necessary force for operating steering apparatus have been known, among which is one where an assist mechanism is provided, between operating levers and operated members, for reducing the operating force to be applied by a human operator.

Assist mechanism of that type is proposed, for example, in JP-A-2-168067, according to which an operating-force reducing unit is provided between two pulleys operatively interconnected via a belt or cable. The following paragraphs describe the assist mechanism disclosed in the 2-168067 publication, with reference to FIG. 11 hereof.

The assist mechanism illustrated in FIG. 11 comprises an operating-lever-side pulley 203 that is rotated by operation of an operating lever 202, a controlled-object-side pulley 205 mounted to an object of control 204, and a power assist unit 206 disposed between these two pulleys 203 and 205.

The power assist unit 206 includes an input pulley 209 connected via an input-side cable 208 to the operating-lever-side pulley 203, an output pulley 212 connected via an output-side cable 211 to the controlled-object-side pulley 205, a strain absorber 213 that not only permits torque transmission between the pulleys 209 and 212 but also permits rotational flexure between the pulleys 209 and 212, and an electric motor 215 coupled via an electro-magnetic clutch 214 to the output pulley 212.

Further, in FIG. 11, reference numeral 216 indicates a controller for controlling the power assist unit 206, and 217 indicates a drive source.

As the operating-lever-side pulley 203 is rotated via the operating lever 202 to thereby rotate the input pulley 209, a direction and intensity of torque applied to the input pulley 209 are detected via a sensor 207. The detected signals are input to the controller 216. Once the torque intensity exceeds a predetermined level, the electromagnetic clutch 214 and electric motor 215 are turned on in response to an output signal from the controller 216, so that the output pulley 212 and electric motor 215 are interconnected and the electric motor 215 is caused to rotate. In this way, the output pulley 212 is given an assist force from the electric motor 215, which can thereby reduce the necessary force for manipulating the operating lever 202.

However, where the power assist unit 206 of the assist mechanism 201, including the input pulley 209, output pulley 212, strain absorber 213, electromagnetic clutch 214 and electric motor 215, is applied to a steering apparatus of a working machine, such as a crawler-type transport vehicle, it would present the problem that the construction of the apparatus tends to become large in scale.

Further, where the aforementioned assist mechanism 201 is to be employed in a steering apparatus of a working machine, a pair of left and right assist mechanisms 201, complicated in structure, are required, which would disadvantageously result in an increased cost of the working machine.

In view of the foregoing, it is currently desired to realize an assist mechanism of a simplified structure which is capable of effectively reducing a necessary force for manipulating a steering apparatus of a working machine, and to minimize the cost of the steering apparatus.

SUMMARY OF THE INVENTION

According to an aspect of the present invention, there is provided an improved working-machine steering apparatus, which comprises: left and right operating members; left and right clutches each operable, in response to operation of a corresponding one of the left and right operating members, to connect or disconnect, to or from a corresponding one of left and right drive shafts, rotational transmission from a drive source; and an assist mechanism, disposed between the left and right operating members and the left and right clutches, for assisting a force for operating any one of the left and right operating members when a corresponding one of the left and right clutches is to be brought into a disconnecting state. The assist mechanism comprises: first and second pulleys fitted over a rotation shaft of the drive source slippably relative to the rotation shaft; a first cord member wound on the first pulley in a U shape with pre-slack, the first cord member being engaged at one end by the left operating member and at another end by a member associated with the left clutch; and a second cord member wound on the second pulley in a U shape with pre-slack, the second cord member being engaged at one end by the right operating member and at another end by a member associated with the right clutch.

The other end of the first cord member is engaged by a left operating arm member that operates the left clutch, and the other end of the second cord member is engaged by a right operating arm member that operates the right clutch.

Thus, as the left operating member is pulled by the human operator, the initially-slackened first cord member is tightened (to eliminate the initial pre-slack) and brought into close contact with the first pulley, and thus, the rotation of the drive source is transmitted to the first pulley. Namely, the left operating arm member can be driven, using the rotation of the drive source. Similarly, as the right operating member is pulled by the human operator, the initially-slackened second cord member is tightened (to eliminate the initial pre-slack) and brought into close contact with the second pulley, and thus, the rotation of the drive source is transmitted to the second pulley. Namely, the right operating arm member can be driven, using the rotation of the drive source.

Thus, by manipulating the left or right operating member, the human operator can readily operate the left or right clutches using the rotation of the drive source. As a result, the assist mechanism for reducing a necessary operating force of the left and right operating members can be achieved with a simple structure, and it is possible to minimize an increase in the number of necessary component parts of the steering apparatus, thereby reducing the cost of the steering apparatus.

Guide wall for preventing unwanted dropout or disengagement of the first and second cord members is provided around the first and second pulleys. Thus, the left and right cables can be prevented from being accidentally disengaged from the first and second pulleys even where the cables have slack. As a consequence, the assist mechanism in the inventive steering apparatus can always operate in a stable manner.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Preferred embodiment of the working-machine steering apparatus of the present invention will be described in relation to a case where the working machine, to which the steering apparatus is applied, is a crawler-type transport vehicle.

Figure 1:
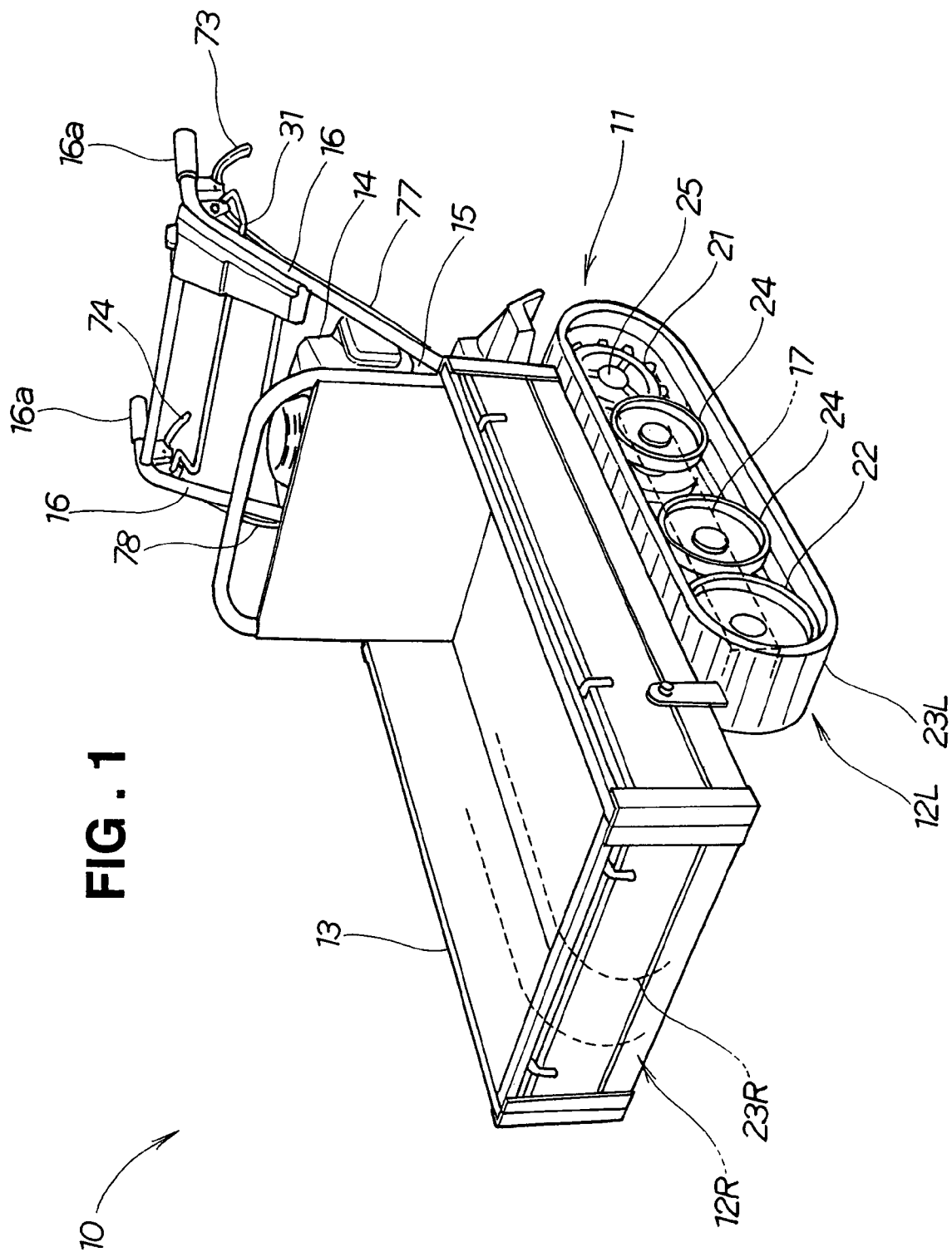
FIG. 1 is a perspective view employing a steering apparatus in accordance with an embodiment of the present invention.
Figure 2:
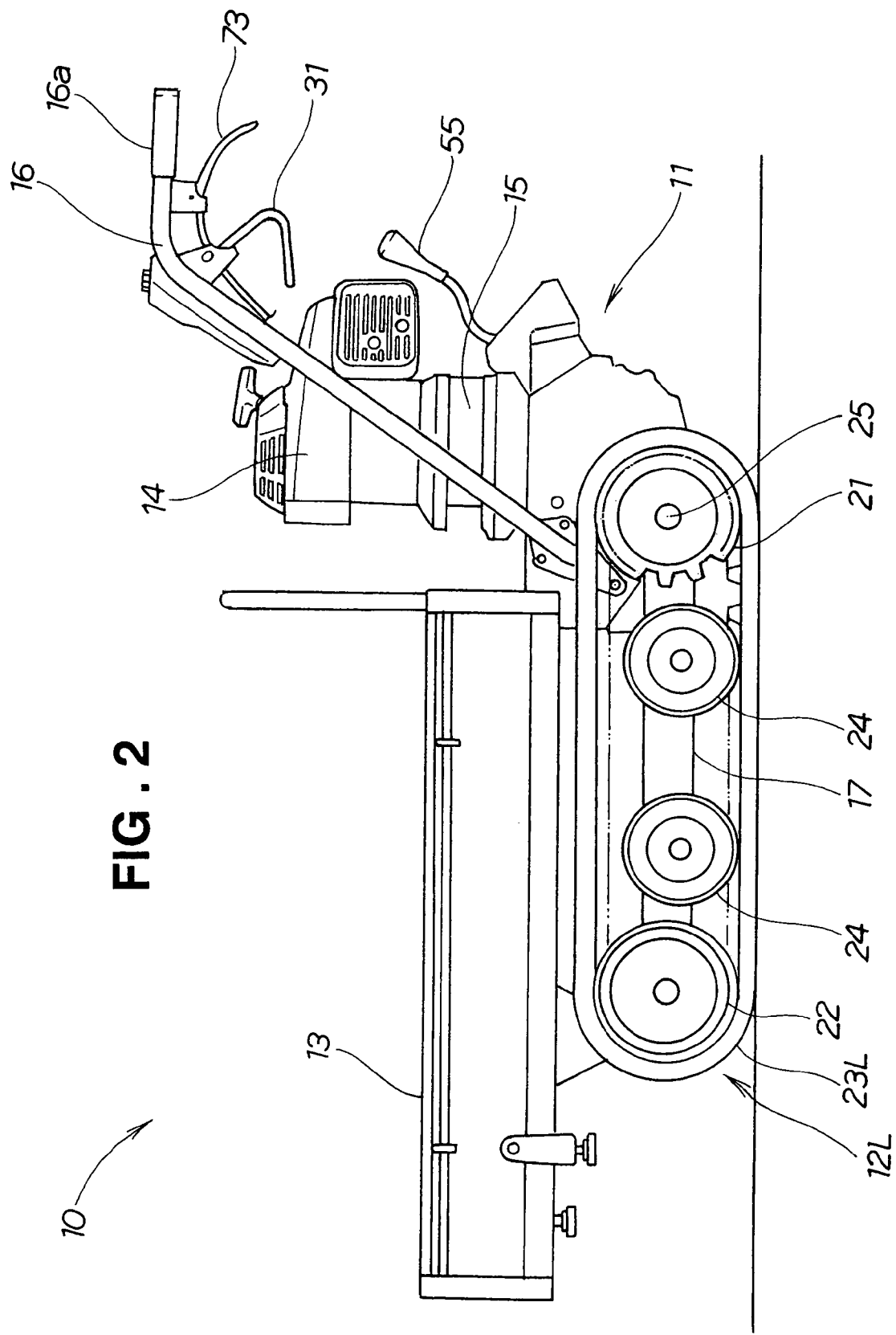
FIG. 2 is a side view of the working machine shown in FIG. 1.

Referring first to FIGS. 1 and 2, the working machine 10 comprises: left and right crawler belt devices 12L and 12R; a luggage carrier 13 mounted on an upper portion of a machine body frame 17; an engine (drive source) 14 and transmission device 15 mounted on a rear portion of the machine body frame 17; and left and right handles 16 extending rearwardly and upwardly from the transmission device 15.

The working machine 10 is a so-called "self-propelled walk-behind" working machine, in which the left and right crawler belt devices 12L and 12R are driven by power output from the engine 14 and a not-shown human operator manipulates the handles 16 while walking behind the working machine 10.

As illustrated in FIG. 2, the left crawler belt device 12L is a running device which includes: a driving wheel 21 attached to a rear portion of the machine body frame 17; a driven wheel 22 attached to a front portion of the machine body frame 17; a left crawler belt 23L connecting between and wound on the driving wheel 21 and the driven wheel 22; and tension rollers 24. The right crawler belt device 12R shown in FIG. 1 is constructed similarly to the left crawler belt device 12L and includes a right crawler belt 23R.

Clutches, which will be later described, can be operated by the human operator gripping separately left and right operating levers (operating members) 73 and 74 provided near respective grips 16a of the handles 16.

In the working machine 10 of FIGS. 1 and 2, as noted above, the power output from the engine 14 is transmitted to the left and right crawler belt devices 12L and 12R via the transmission device 15.

Figure 3:
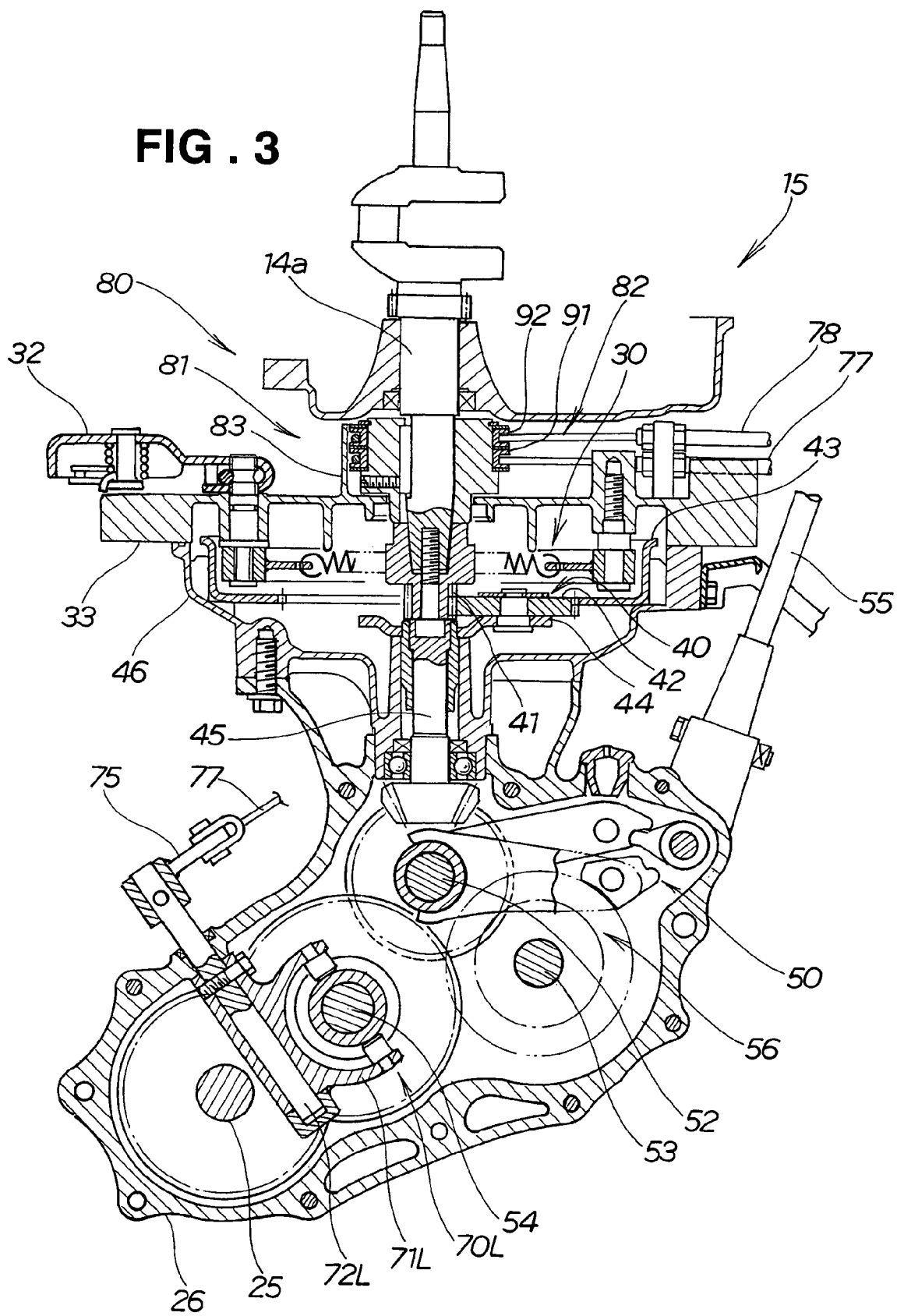
FIG. 3 is a sectional view of a transmission device shown in FIG. 2.

FIG. 3 is a sectional view of the transmission device 15 shown in FIG. 2.

Figure 4:
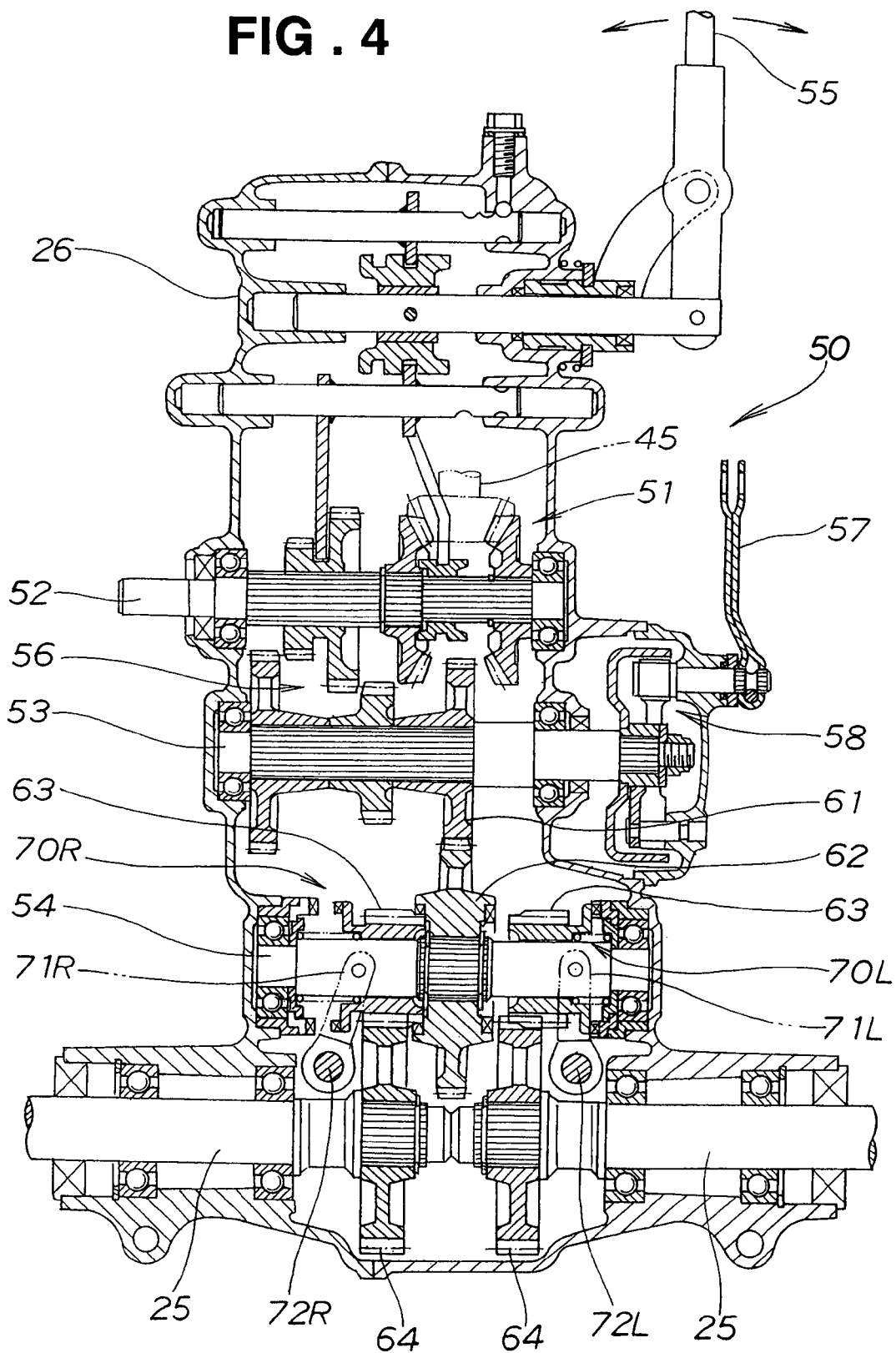
FIG. 4 is a sectional view of a gear transmission mechanism shown in FIG. 3.

The transmission device 15 includes: a planet gear mechanism 40 whose input side is connected, via a main clutch 30, to an output shaft 14a of the engine 14; a connection shaft 45 extending downward from the output side of the planet gear mechanism 40; left and right drive shafts 25 (see FIG. 4) connected to the connection shaft 45 via a gear transmission mechanism 50 and left and right clutches 70L and 70R (the right clutch 70R is shown in FIG. 4); and a transmission case 26 housing the whole or part of the main clutch 30, planet gear mechanism 40, gear transmission mechanism 50, left and right clutches 70L and 70R and left and right drive shafts 25. The drive shafts 25 are axles connected to the driving wheels 21 shown in FIG. 2.

The main clutch 30 is in the form of a diameter-expandable brake structure that turns on/off rotation of an inner-tooth gear 43 of the planet gear mechanism 40, and it is switched between connecting and disconnecting states by means of a main clutch lever 31 fixed on one of the handles 16 (see FIG. 2). The main clutch lever 31 is a clutch operating member operatively connected to an actuating arm 32 of the main clutch 30 via a wire cable (not shown), and it is housed in a case 33.

The planet gear mechanism 40 includes a sun gear 41 mounted on the output shaft 14a of the engine 14, a plurality of planet gears 42 meshing with the sun gear 41, the above-mentioned inner-tooth gear 43 meshing with the planet gears 42, a carrier 44 rotatably supporting the plurality of planet gears 42, and the above-mentioned connection shaft 45 to which is connected the carrier 44. The planet gear mechanism 40 is covered with a gear case 46.

FIG. 4 shows the gear transmission mechanism 50 and left and right clutches 70L and 70R shown in FIG. 3.

The gear transmission mechanism 50 includes a first shaft 52 connected to the connection shaft 45 via a bevel gear 51, and second and third shafts 53 and 54 disposed in parallel to the first shaft 52.

Rotation of the first shaft 52 can be switched between forward and reverse rotation directions by the rotation direction of the bevel gear 51 being switched via a gearshift lever 55.

Rotation speed of the second shaft 53 can be changed by the meshing of a transmission gear mechanism 56 being switched via the gearshift lever 55. Further, the second shaft 53 can be braked via a drum brake 58 by operation of a brake lever 57.

First gear 61 mounted on the second shaft 53 meshes with a second gear 62 mounted on the third shaft 54, by which the power of the engine 14 (see FIG. 2) is transmitted from the second shaft 53 to the third shaft 54.

In the gear transmission mechanism 50, left and right third gears 63 are mounted on the third shaft 54, having the second gear 62 mounted thereon, in such a manner that the left and right third gears 63 can rotate about the shaft 54 and axially move along the shaft 54. Left and right fourth gears 64 mesh with the left and right third gears 63, respectively.

The left and right fourth gears 64 are mounted on the left and right drive shafts 25, respectively. The left and right drive shafts 25 are positioned in linear alignment with each other and with respective one ends abutted against each other. The first to fourth gears 61 to 64 are each in the form of a spur gear.

The left and clutches 70L and 70R are caused to place the respective left and right third gears 63 in a connected or disconnected state independently of each other, by the human operator separately operating left and right clutch arms 71L and 71R. The left and right clutch arms 71L and 71R are generally in a shape of a fork and mounted on clutch actuating shafts 72L and 72R, respectively.

The human operator can cause the left and right clutch arms 71L and 71R to pivot, by separately gripping the left and right operating levers 73 and 74 (see FIG. 1), so as to operate the left and right clutches 70L and 70R.

As will be later described, the steering apparatus 80, as clearly shown in FIG. 6, comprises the above-mentioned left and right operating levers 73 and 74 (see FIG. 1), an assist mechanism 81 (see FIG. 3), and the above-mentioned left and right clutches 70L and 70R. As the human operator grips the left operating lever 73, the left clutch 70L is turned OFF and thus the left crawler belt 23 (see FIG. 1) is deactivated, so that the drive power of the engine 14 (see FIG. 2) is transmitted to only the right crawler belt 23R to thereby allow the working machine 10 to turn left. As the human operator grips the right operating lever 74, the right clutch 70R is turned OFF and thus the right crawler belt 23R (see FIG. 1) is deactivated, so that the drive power of the engine 14 (see FIG. 2) is transmitted to only the left crawler belt 23L to thereby allow the working machine 10 to turn right.

Figure 5:
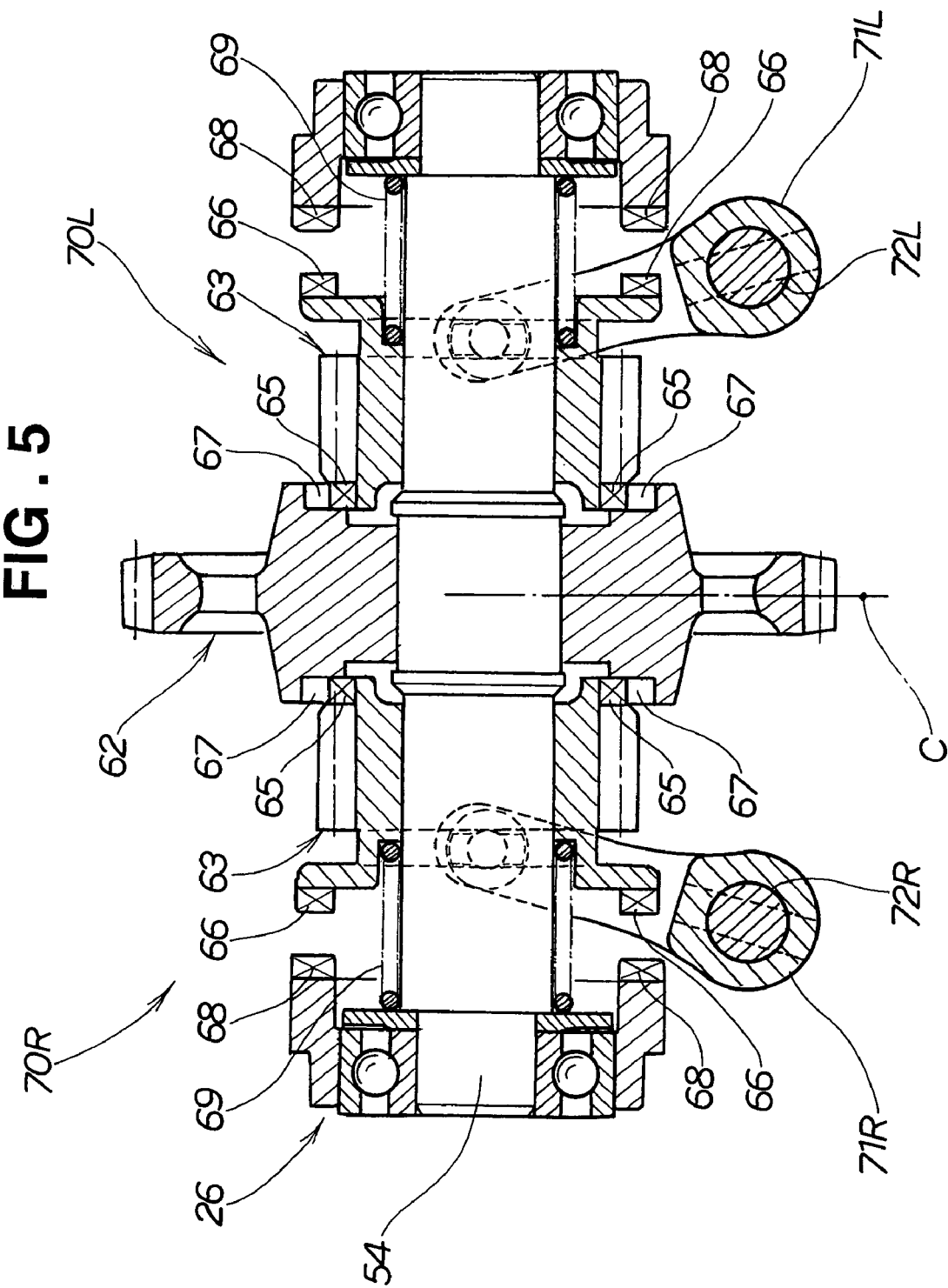
FIG. 5 is a sectional view of left and right clutches shown in FIG. 4.

FIG. 5 shows details of the left and right clutches 70L and 70R illustrated in FIG. 4.

The left clutch 70L includes the third gear (driven gear) 63 sidably mounted on the third shaft 54, a plurality of inner clutch claws 65 and outer clutch claws 66 formed on the inner and outer sides, respectively, of the third gear 63, a plurality of driving clutch claws 67 formed on the second gear (driving gear) 62 meshing with the inner clutch claws 65, and a plurality of case-side clutch claws 68 formed on the mission case 26 (FIG. 4) meshing with the outer clutch claws 66. The left clutch 70L also includes a clutch spring 69 that presses the third gear 63 against the second gear 62, and the above-mentioned left clutch arm 71 that compresses the clutch spring 69 to push the third gear 63 closer to the transmission case 26.

Once the plurality of inner clutch claws 65 of the third gear 63 are brought into meshing engagement with the plurality of driving clutch claws 67 of the second gear 62, a rotational force from the second gear 62 is transmitted to the third gear 63, so that the left clutch 70L is placed in a clutch-ON state. On the other hand, once the inner clutch claws 65 are brought out of engagement with the driving clutch claws 67, the rotational force from the second gear 62 to the third gear 63 is lost, so that the left clutch 70L is placed in a clutch-OFF state.

Further, as the plurality of outer clutch claws 66 of the third gear 63 are brought into meshing engagement with the plurality of case-side clutch claws 68, the left clutch 70L is placed in a braking state to terminate the rotation of the third gear 63.

Namely, the above-described left clutch 70L is a composite clutch (i.e., brake/clutch) which has not only a clutch function for turning ON/OFF the rotation of the third gear 63 but also a brake function for terminating the rotation of the third gear 63. The left clutch 70L is commonly known as a "dog clutch" or "jaw clutch".

The left clutch 70L is driven by a left operating arm member 75 (see FIG. 6) via the left clutch actuating shaft 72L.

The right clutch arm 70R, which is positioned symmetrically to the left clutch 70L about a centerline C, is constructed in a similar manner to the left clutch 70L. The right clutch 70R is driven by a right operating arm member 76 (see FIG. 6) via the right clutch actuating shaft 72R.

Figure 6:
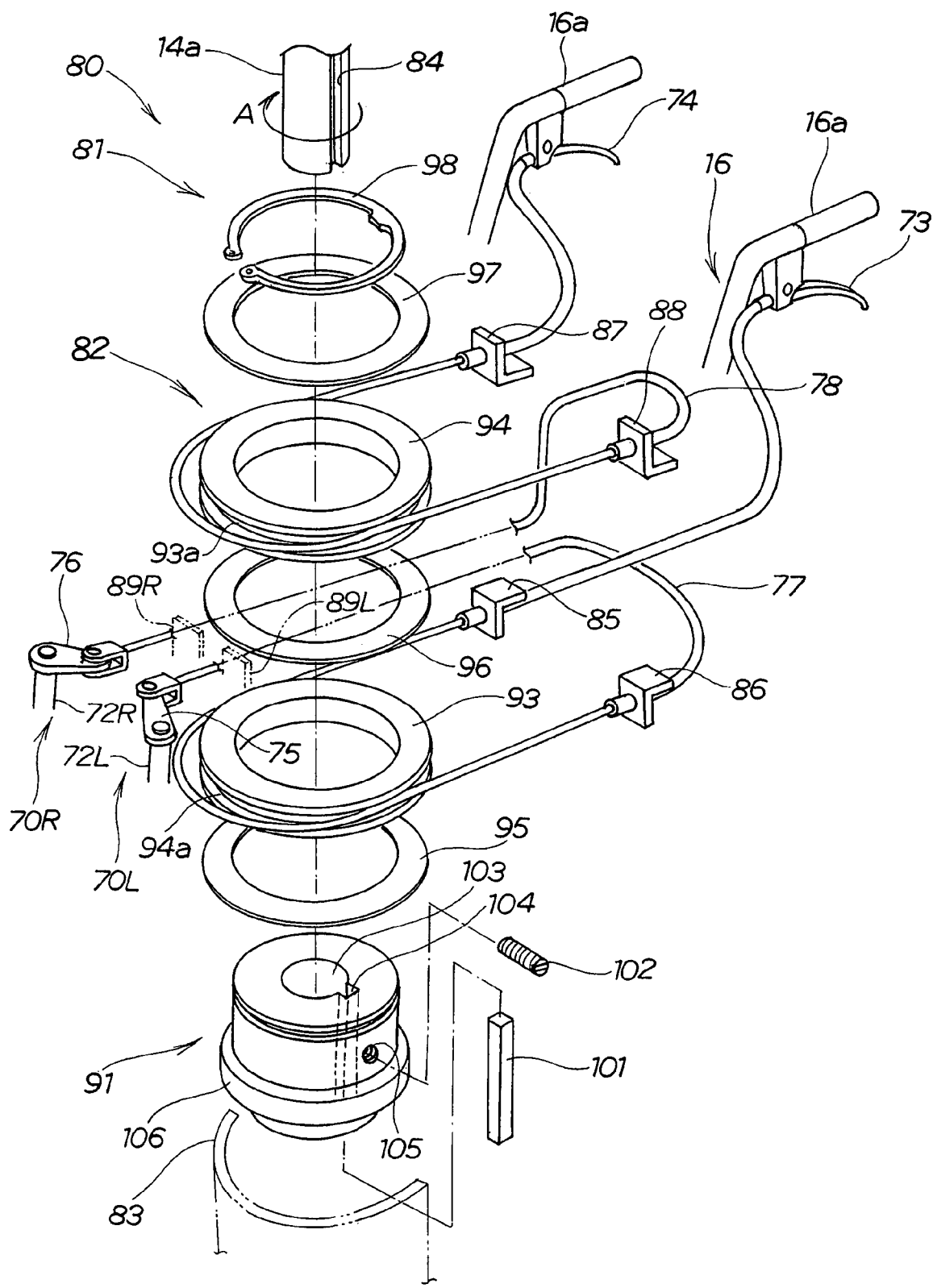
FIG. 6 is an exploded perspective view of an assist mechanism employed in the steering apparatus shown in FIG. 3.

FIG. 6 shows the assist mechanism 81 employed in the steering apparatus 80 of the present invention.

The steering apparatus 80 includes: the left and right operating levers 73 and 74 operable to turn left or right the working machine 10 (FIG. 1); the assist mechanism 81 intended to reduce a necessary force for operating the left and right operating levers 73 and 74; and the left and right clutches 70L and 70R for connecting or disconnecting the drive power to or from the left and right crawler belt devices 12L and 12R via the assist mechanism 81.

The assist mechanism 81 comprises: the output shaft 14a of the engine 14 (FIG. 2); a pulley assembly 82 connected to the engine output shaft 14a; left and right cables 77 and 78; and a guide wall 83.

The left cable 77 is wound on the pulley assembly 82 generally in a U shape, and the left cable 77 is retained or engaged at one end by the left operating lever 73 and at the other end by the left operating arm member 75 that operates the left clutch 70L. The left cable 77 is a first cord member in the assist mechanism 81.

Similarly, the right cable 78 is wound on the pulley assembly 82 generally in a U shape, and the right cable 78 has one end retained by the right operating lever 74 and the other end retained by the right operating arm member 76 that operates the left clutch 70L. The right cable 78 is a second cord member in the assist mechanism 81.

The above-mentioned guide wall 83 is formed, on the case 33 of the main clutch 30 (see FIG. 3), for guiding the cables 77 and 78. The guide wall 83 covers first and second pulleys 93 and 94 in a semicircular configuration.

With the guide wall 83 provided, around or along the outer periphery of the first and second pulleys 93 and 94, for preventing accidental disengagement of the left and right cables 77 and 78, the left and right cables 77 and 78 can be prevented from being accidentally disengaged from the first and second pulleys 93 and 94 even where the cables 77 and 78 have slack. As a consequence, the assist mechanism 81 can always operate in a stable manner.

The output shaft 14a has an axial key groove (hereinafter "shaft key groove") 84. The first and second pulleys 93 and 94 are coupled with each other while keeping a predetermined friction coefficient.

The left cable 77 is guided by a cable guide 85 located closer to the left operating lever 73 (see FIG. 1) than the first pulley 93 and by cable guides 86 and 89L located closer to the left clutch 70L than the first pulley 93. Further, the left cable. 77 is wound on the first pulley 93 so that the pulley 93 rotates, in response to operation of the left operating lever 73, in the same direction as a rotating direction A of the engine output shaft 14a.

The right cable 78 is guided by a cable guide 87 located closer to the right operating lever 74 (see FIG. 1) than the second pulley 94 and by cable guides 88 and 89R located closer to the right clutch 70R than the second pulley 94. Further, the right cable 78 is wound on the second pulley 94 so that the pulley 94 rotates, in response to operation of the right operating lever 74, in the same direction as the rotating direction A of the engine output shaft 14a.

The above-mentioned pulley assembly 82 includes: a cylindrical member 91 connected to the engine output shaft 14a; a lower washer 95 fitted over the cylindrical member 91; the first pulley 93 fitted over the cylindrical member 91 from above the lower washer 95; a middle washer 96 fitted over the cylindrical member 91 from above the first pulley 93; the second pulley 94 fitted over the cylindrical member 91 from above the middle washer 96; an upper washer 97 fitted over the cylindrical member 91 from above the second pulley 94; and a retaining ring 98 that collectively retains the first and second pulleys 93 and 94 and washers 95, 96 and 97 to the cylindrical member 91, rotatably and slippably relative to the cylindrical member 91. The engine output shaft 14a and the cylindrical member 91 are fixed together via a key 101 and retaining screw 102.

Reference numerals 93a and 94a represent grooves formed in the first and second pulleys 93 and 94.

The cylindrical members 91 has a shoulder portion 106 supporting thereon the first and second pulleys 93 and 94 and washers 95, 96 and 97, a through-hole 103 where the engine output shaft 14a is inserted; a pulley key groove 104, and a female threaded portion 105 into which the retaining screw 101 is screwed.

Figure 7:
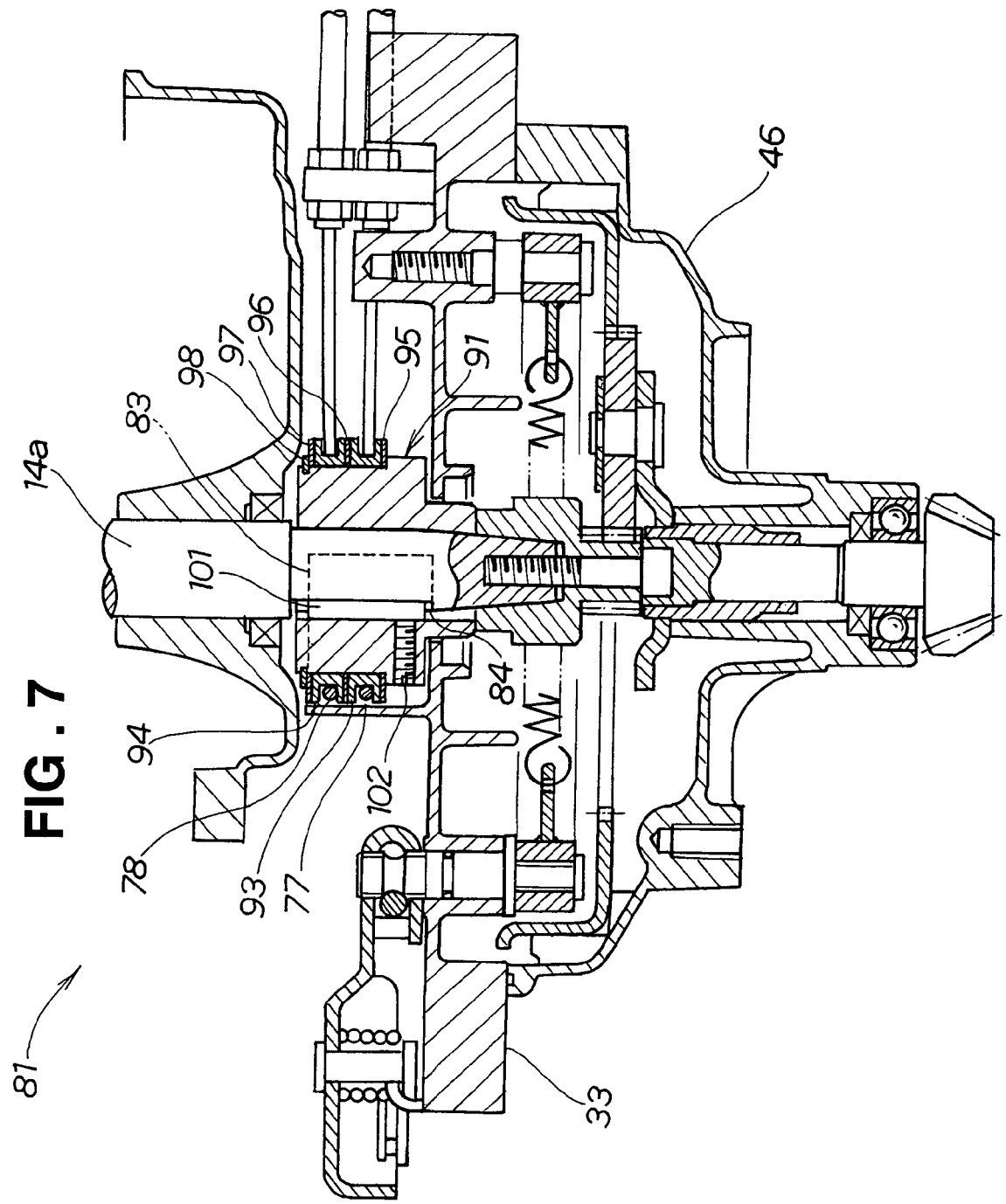
FIG. 7 is a sectional view of the assist mechanism shown in FIG. 6.

As illustrated in FIG. 7, the pulley assembly 82 is non-rotatably mounted on the engine output shaft 14a by means of the key 10 inserted in the shaft key groove 84 and pulley key groove 104 and the retaining screw 101 pressing the key 101 against the output shaft 14a.

The following paragraphs describe behavior of the assist mechanism 81.

Figure 8A:
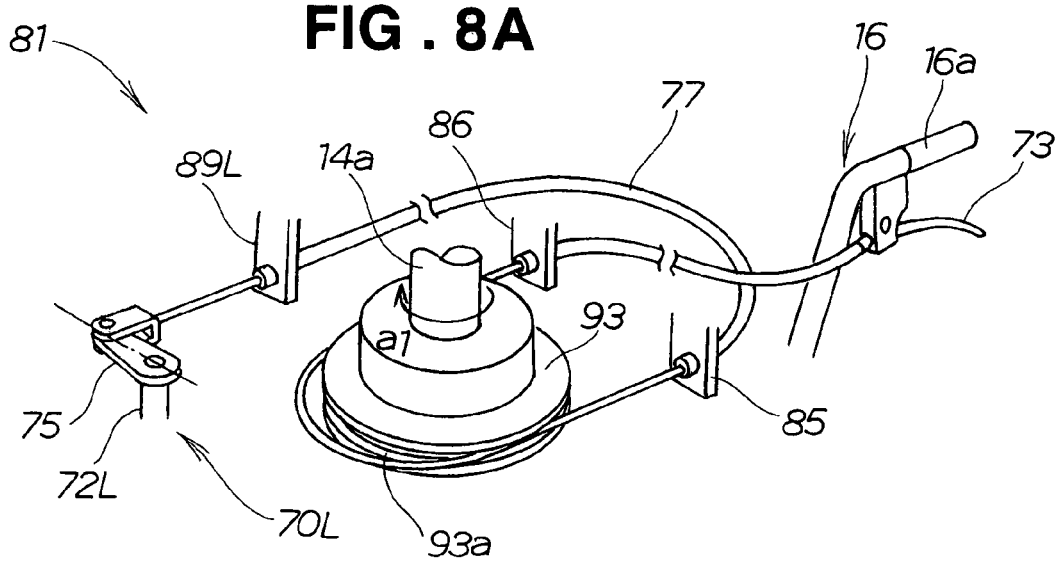
FIGS. 8A, 8B and 8C are views showing behavior of the assist mechanism when the working machine makes a left turn.
Figure 8B:
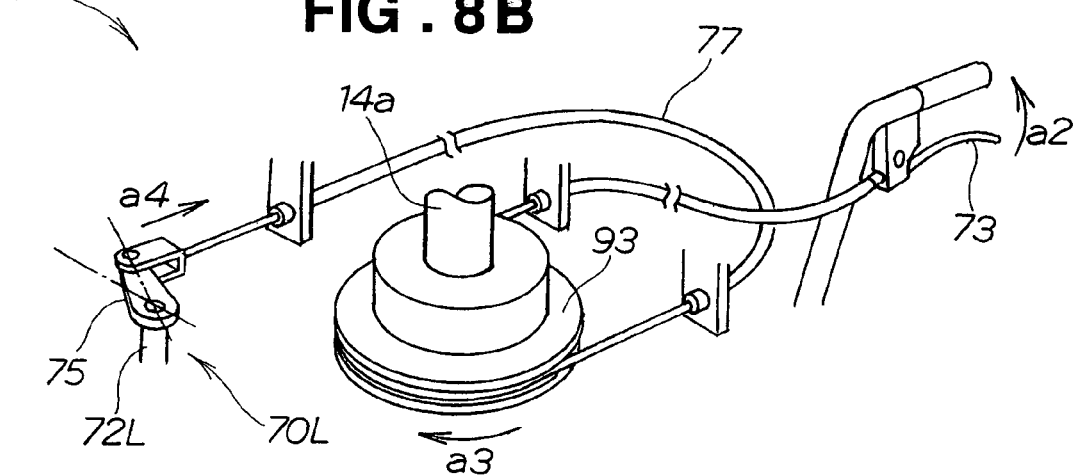
Figure 8C:
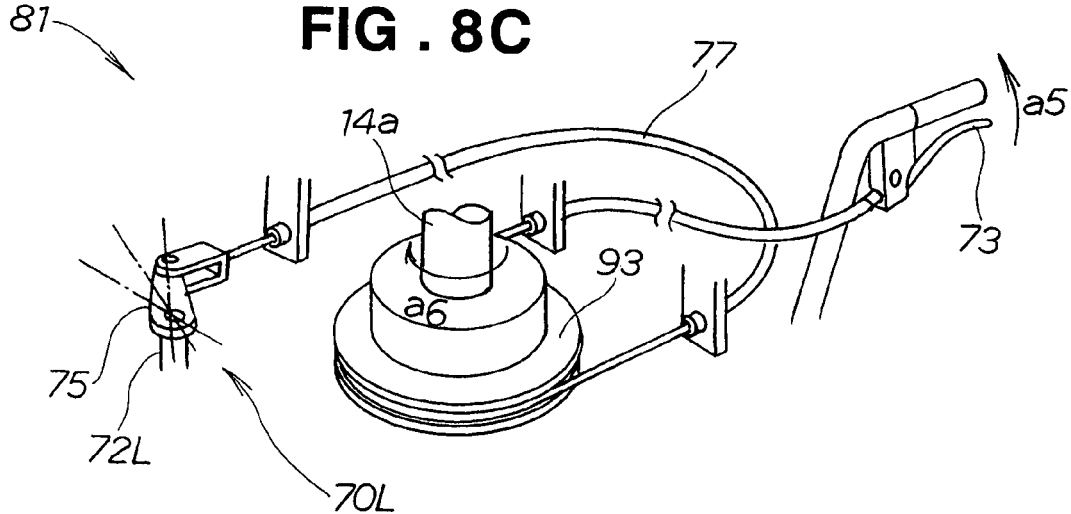

FIGS. 8A, 8B and 8C show behavior of the assist mechanism 81 when the working machine 10 makes a left turn.

In Fig, 8A, the left operating lever 73 is shown as being in a condition prior to the turning operation, and the left clutch 70L is shown as being in the connecting state. At this time, the left cable 77 has slight initial slack ("pre-slack") relative to the first pulley 93 and is being guided by the guide wall 83 shown in FIG. 7 so that the left cable 77 can prevented from being disengaged from the groove 93a of the first pulley 93.

In Fig, 8A, the engine 14 (see FIG. 2) is rotating in a direction of arrow a1, and the first pulley 93 is slipping (i.e., running idle) relative to the output shaft 14a.

As the human operator grips the left operating lever 73 as indicated at arrow a2, as shown in FIG. 8B, the initial slack of the left cable 77 is eliminated so that the left cable 77 is tightened and brought into close contact with the first pulley 93, and thus, the rotation of the engine output shaft 14a is transmitted to the first pulley 93 as indicated by arrow a3. As a consequence, the left cable 77 is pulled in a direction of arrow a4, and the left operating arm member 75 is turned through a predetermined angle. By the rotating force of the engine output shaft 14a being transmitted to the first pulley 93 in the aforementioned manner, the necessary force for operating the left operating lever 73 can be significantly reduced; thus, the human operator can operate the left clutch 70L with a reduced operating force.

As the left operating lever 73 is fully gripped as indicated by arrow a5, as illustrated in FIG. 8C, the left clutch 70L is brought into the OFF state, in which the first pulley 93 is bound by the left cable 77. Therefore, the first pulley 93 slips (runs idle) relative to the engine output shaft 14a, so that only the output shaft 14a rotates as indicated by arrow a6 with the first pulley 93 caused to stop rotating.

Figure 9A:
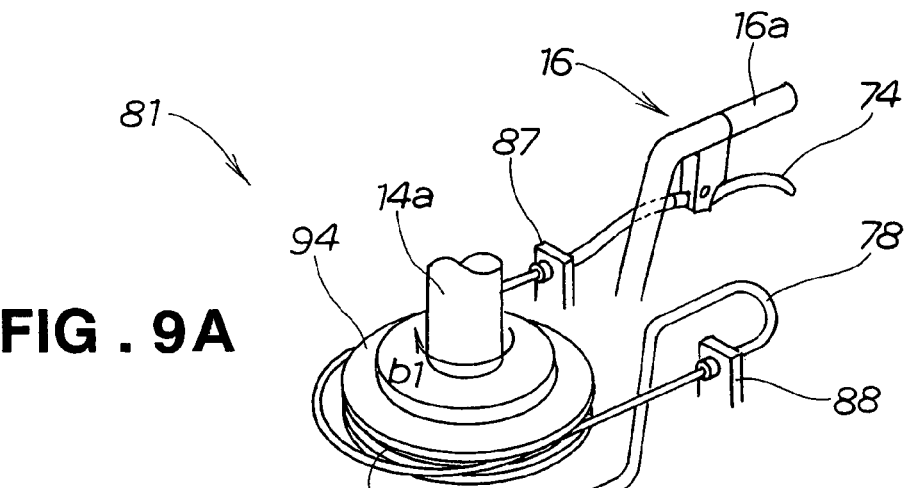
FIGS. 9A, 9B and 9C are views showing behavior of the assist mechanism when the working machine makes a right turn.
Figure 9B:
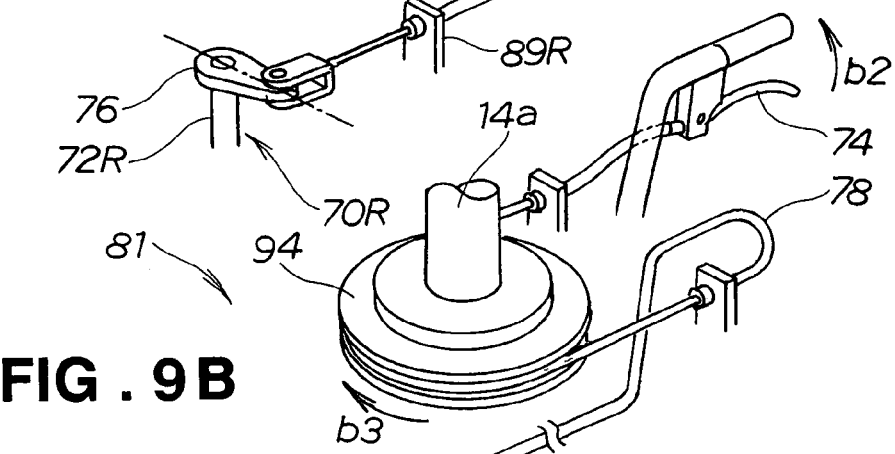
Figure 9C:
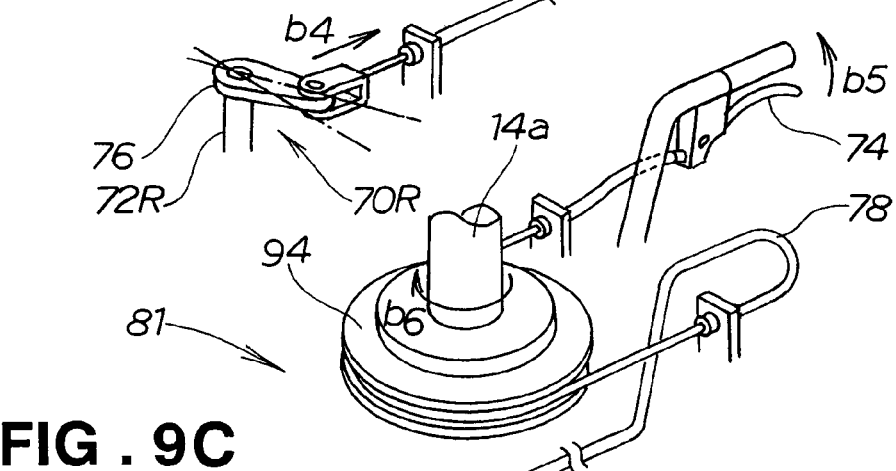

FIGS. 9A, 9B and 9C show behavior of the assist mechanism 81 when the working machine makes a right turn.

In Fig, 9A, the right operating lever 74 is shown as being in an condition prior to the turning operation, and the right clutch 70R is shown as being in the connecting state. At this time, the right cable 78 has slight initial slack ("pre-slack") relative to the second pulley 94 and is being guided by the guide wall 83 shown in FIG. 7 so that the right cable 78 can be prevented from being disengaged from the groove 94a of the second pulley 94.

In Fig, 9A, the engine 14 (see FIG. 2) is rotating in a direction of arrow b1, and the second pulley 94 is slipping (running idle) relative to the output shaft 14a.

As the human operator grips the right operating lever 74 as indicated at arrow b2, as shown in FIG. 9B, the initial slack of the right cable 78 is eliminated so that the right cable 78 is tightened and brought into close contact with the second pulley 94, and thus, the rotation of the engine output shaft 14a is transmitted to the second pulley 94 as indicated by arrow b3. As a consequence, the right cable 78 is pulled in a direction of arrow b4, and the right operating arm member 76 is turned through a predetermined angle. By the rotating force of the engine output shaft 14a being transmitted to the second pulley 94 in the aforementioned manner, the necessary force for operating the right operating lever 74 can be significantly reduced; thus, the human operator can operate the right clutch 70R with a reduced operating force.

As the right operating lever 74 is fully gripped as indicated by arrow b5, as illustrated in FIG. 9C, the right clutch 70R is brought into the OFF state, in which the second pulley 94 is bound by the right cable 78. Therefore, the second pulley 94 slips (runs idle) relative to the engine output shaft 14a, so that only the output shaft 14a rotates as indicated by arrow b6 with the second pulley 94 caused to stop rotating.

Figure 10:
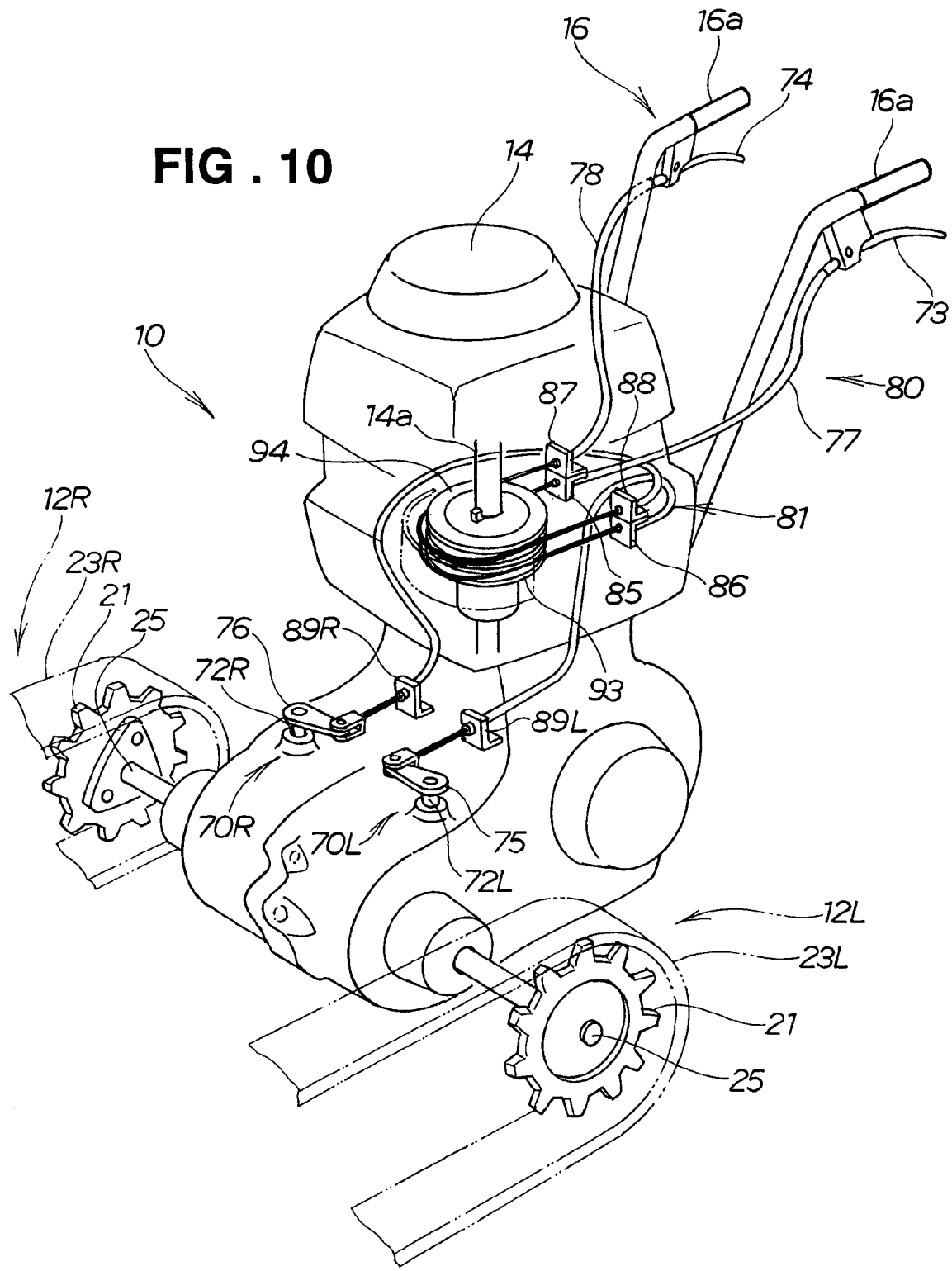
FIG. 10 is a perspective view showing the steering apparatus of the present invention.
Figure 11:
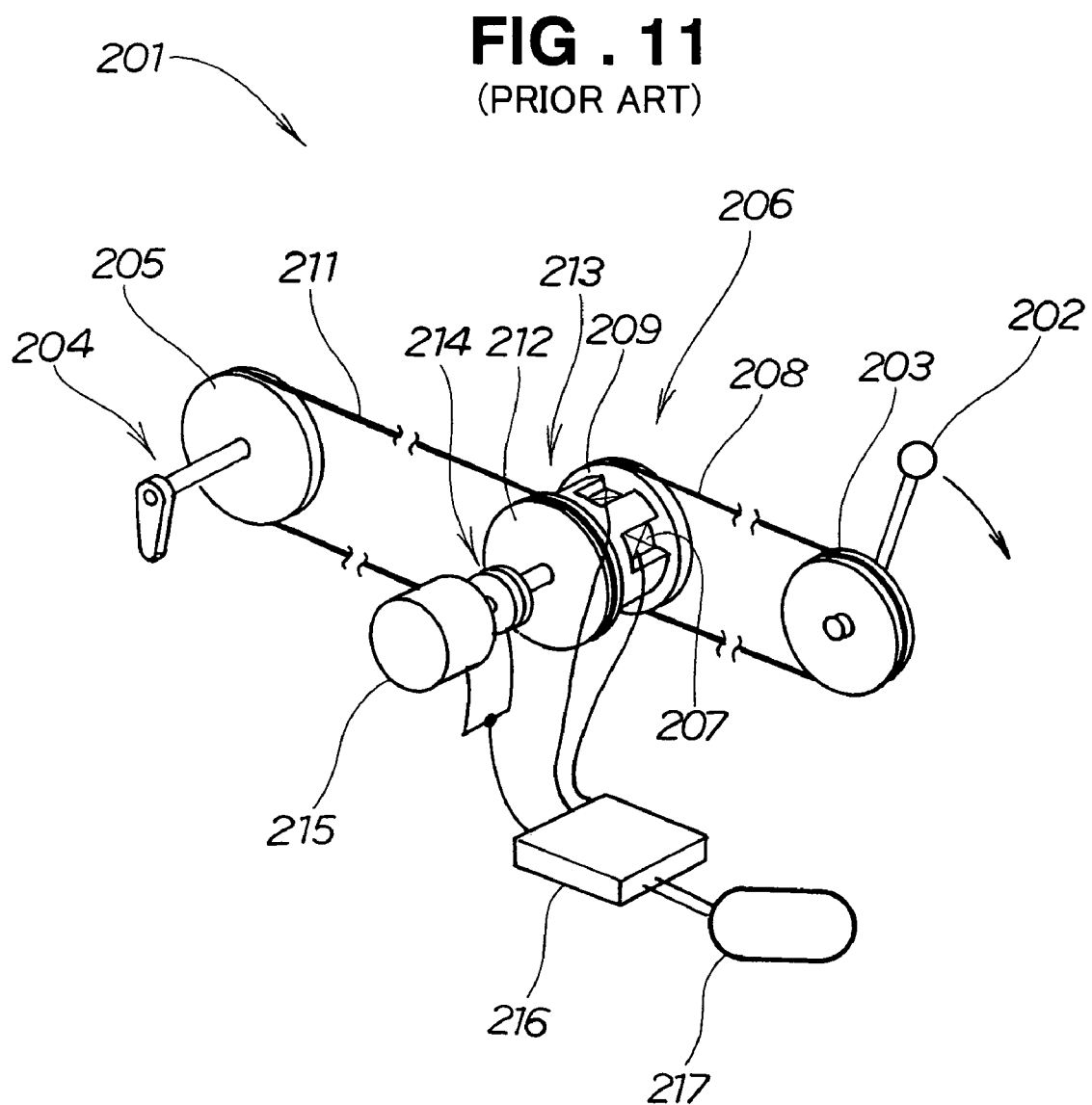
FIG. 11 is a schematic view of a conventional assist mechanism.

Referring now to FIG. 10, the steering apparatus 80 comprises the left and right operating levers 73 and 74, assist mechanism 81, and left and right clutches 70L and 70R. The working machine 10 can be turned left by the human operator gripping the left operating lever 73 to turn OFF the left clutch 70L and thereby deactivate the left crawler belt 23L so that the drive power of the engine 14 can be transmitted only to the right crawler belt 23R. The working machine 10 can be turned right by the human operator gripping the right operating lever 74 to turn OFF the right clutch 70R and thereby deactivate the right crawler belt 23R so that the drive power of the engine 14 can be transmitted only to the left crawler belt 23L.

At that time, the human operator can operate the left and right clutches 70L and 70R via the assist mechanism 81 using the rotation of the output shaft 14a. As a result, it is possible to provide the assist mechanism 81 of a simple structure, and an increase in the number of necessary component parts of the steering apparatus 80, which is required to reduce the operating force of the left and right clutches 70L and 70R, can be minimized.

Further, because the rotation of the engine output shaft 14a, which is an existing component part of the working machine, can be used to reduce the necessary operating force of the steering apparatus 80, it is possible to reduce the necessary cost for reducing the necessary operating force of the steering apparatus 80.

Whereas the preferred embodiment of the steering apparatus has been described above in relation to the case where the assist mechanism 81 is disposed around the output shaft 14a of the engine 14 as illustrated in FIG. 6, the present invention is not so limited; for example, the rotation of the engine may be transmitted to the assist mechanism 81 via a speed reducer that reduces the number of rotations of the engine output shaft 14a.

Further, whereas the preferred embodiment of the steering apparatus has been described above as including the guide wall 83 covering the first and second pulleys 93 and 94 in a semicircular configuration, the present invention is not so limited; for example, the guide wall 83 may have a plurality of pins disposed around the outer periphery of the pulleys 93 and 94.

The working-machine steering apparatus of the present invention is suited for use in any other machines than snow-removing machines traveling via left and right crawler belts, such as cultivating machines that travel via left and right wheels.

Obviously, various minor changes and modifications of the present invention are possible in the light of the above teaching. It is therefore to be understood that within the scope of the appended claims the invention may be practiced otherwise than as specifically described.

What is claimed is:

1. A working-machine steering apparatus comprising:

left and right operating members;

left and right clutches each operable, in response to operation of a corresponding one of said left and right operating members, to connect or disconnect, to or from a corresponding one of left and right drive shafts, rotational transmission from a drive source; and an assist mechanism, disposed between said left and right operating members and said left and right clutches, for assisting a force for operating any one of said left and right operating members when a corresponding one of said left and right clutches is to be brought into a disconnecting state, said assist mechanism comprising:

first and second pulleys fitted over a rotation shaft of the drive source slippably relative to the rotation shaft;

a first cord member wound on said first pulley in a U shape with pre-slack, said first cord member being engaged at one end by said left operating member and at another end by a member associated with said left clutch; and a second cord member wound on said second pulley in a U shape with pre-slack, said second cord member being engaged at one end by said right operating member and at another end by a member associated with said right clutch.

2. The working-machine steering apparatus according to claim 1; wherein the other end of said first cord member is engaged by a left operating arm member that operates said left clutch, and the other end of said second cord member is engaged by a right operating arm member that operates said right clutch.

3. The working-machine steering apparatus according to claim 1; wherein a guide wall for preventing disengagement of said first cord member and said second cord member is provided around said first pulley and said second pulley.

* * * * *